United States Patent
Geiger et al.

(10) Patent No.: US 10,754,691 B2
(45) Date of Patent: Aug. 25, 2020

(54) POLICY BASED REQUESTING/APPROVAL SYSTEM ACROSS MULTIPLE HYBRID CLOUDS

(71) Applicant: International Business Machines Corporation, Armonk, NY (US)

(72) Inventors: Adam R. Geiger, Cary, NC (US); Hugh E. Hockett, Raleigh, NC (US); Wei Lung Chan, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 16/020,344

(22) Filed: Jun. 27, 2018

(65) Prior Publication Data
US 2020/0004589 A1  Jan. 2, 2020

(51) Int. Cl.
*G06F 15/173* (2006.01)
*G06F 9/50* (2006.01)
*H04L 29/06* (2006.01)
*H04L 12/24* (2006.01)
*H04L 29/08* (2006.01)

(52) U.S. Cl.
CPC .......... *G06F 9/5005* (2013.01); *G06F 9/5077* (2013.01); *H04L 41/0893* (2013.01); *H04L 63/20* (2013.01); *H04L 67/327* (2013.01)

(58) Field of Classification Search
None
See application file for complete search history.

(56) References Cited

U.S. PATENT DOCUMENTS

| 8,296,434 | B1 | 10/2012 | Miller et al. | |
|---|---|---|---|---|
| 9,344,751 | B1* | 5/2016 | Ream | H04N 21/242 |
| 9,769,085 | B2* | 9/2017 | Laribi | H04L 12/6418 |
| 9,912,607 | B2* | 3/2018 | Steinder | H04L 47/783 |
| 2011/0016214 | A1* | 1/2011 | Jackson | G06F 9/5044 |
| | | | | 709/226 |
| 2011/0078303 | A1* | 3/2011 | Li | G06F 9/505 |
| | | | | 709/224 |
| 2013/0212064 | A1* | 8/2013 | Mahmoud | G06F 16/217 |
| | | | | 707/609 |

(Continued)

OTHER PUBLICATIONS

"Scaling Based on a Queue-based Workload," Google, Nov. 2017, 4 pages.

(Continued)

*Primary Examiner* — Dhairya A Patel
(74) *Attorney, Agent, or Firm* — VanLeeuwen & VanLeeuwen; Christopher M. Pignato

(57) ABSTRACT

An approach is provided in which an information handling system receives a scaling request corresponding to an application that includes multiple workloads executing on a first cloud environment and a second cloud environment. The first cloud environment is managed by a first service provider and the second cloud environment is managed by a second service provider. The information handling system evaluates the scaling request against a first set of policies corresponding to the first service provider and against a second set of policies corresponding to the second service provider. In turn, the information handling system scales, in response to the evaluating, one or more first resources on the first cloud environment and one or more second resources on the second cloud environment to fulfill the scaling request.

11 Claims, 9 Drawing Sheets

(56) References Cited

U.S. PATENT DOCUMENTS

| | | | |
|---|---|---|---|
| 2013/0339419 A1* | 12/2013 | Emaru | G06F 9/4856 709/201 |
| 2014/0101013 A1 | 4/2014 | Baset et al. | |
| 2014/0304366 A1* | 10/2014 | Fletcher | H04L 65/1066 709/217 |
| 2015/0002614 A1* | 1/2015 | Zino | H04N 7/148 348/14.08 |
| 2016/0134558 A1* | 5/2016 | Steinder | H04L 47/783 709/226 |
| 2016/0330177 A1* | 11/2016 | Singleton, IV | H04L 9/0827 |
| 2017/0339070 A1 | 11/2017 | Chang et al. | |

OTHER PUBLICATIONS

"Defining scaling policies to manage workload," International Business Machines Corporation, Aug. 2015, 3 pages.

Welch, "Chef Launches Policy-Based Provisioning," Chef Blog, Nov. 2014, 9 pages.

* cited by examiner

User Policies 310

-API: Create Policy

Input Parameters
Maximum CPU allowed

Maximum Memory allowed

Maximum Storage allowed

Maximum Network allowed

Maximum of any other related resources allowed

Maximum amount of cost for a given cloud provider across all resources

Types of workloads allowed to use this policy (e.g. application like WAS)

Users allowed to use this policy

Groups of users allowed to use this policy

Cloud Provider Accounts

Cloud Provider Type

Meets security requirements including patch level, network isolation requirements (e.g. behind firewall), etc

*FIG. 4*

Table 500

| Action | Input Parameter | Output |
| --- | --- | --- |
| Create a new policy with ID | | Policy ID |
| Attach policy to workload | Policy ID, Workload ID | |
| Attaches policy to workload (configures linkage between policy and workload) | Policy ID, Workload ID | Linkage ID between policy and workload |
| Request resources | Workload ID, Components to scale ID, amount to scale, Cloud provider ID | |
| Find policy based on workload ID | Workload ID | Approved: Resources dynamically allocated and returned to the workload for use. Denied: Resource not dynamically allocated |

| Workload/Cloud | Scaling Request 360 | | | Scaling Result 610 | | |
|---|---|---|---|---|---|---|
| | CPU | Memory | Network | CPU | Memory | Network |
| W1/CA | Increase | Increase | Decrease | | | Decrease |
| W2/CB | | | | | Increase | |
| W3/CC | | | | Increase | | |

700

| Workload/ Cloud | Scaling Request 360 | | | Scaling Result 710 | | |
|---|---|---|---|---|---|---|
| | Storage | Security Compliance | Cost | Storage | Security Compliance | Cost |
| W1/CA | Increase | Increase | Decrease | Increase | Increase | Decrease |
| W2/CB | | | | | | |
| W3/CC | | | | | | |

*FIG. 7*

POLICY BASED REQUESTING/APPROVAL SYSTEM ACROSS MULTIPLE HYBRID CLOUDS

BACKGROUND

When an application is provisioned in a cloud environment, the application is defined with certain parameters or resources such as CPU (central processing unit) core resources, memory resources, disk resources, network resources, etc. The resources are typically fixed until an end user or workload defines or partitions a higher/lower value of one of the resources for the application. When this occurs and when the application's workloads are executing on a single cloud environment, the workloads typically have the ability to increase their resources automatically within the single cloud environment based on demand.

Hybrid cloud solutions are becoming more common where a solution is built from components across multiple cloud providers and an application's workloads may span across multiple cloud providers. Current hybrid cloud solutions, however, do not have checks and balances in place for a given workload to allocate additional resources across the multiple cloud providers. As a result, an application's workloads' ability to dynamically scale resources is lost in a hybrid cloud environment. In turn, a system designer has a choice to initially provision the application with an increased amount of resources, which wastes money, or a decreased amount of resources, which risks performance issues.

Cloud environments are a known type of computing environment. Cloud environments typically: (i) are distributed in space (for example, multiple computers communicating with each other over wide area and local area networks); (ii) change in their topography over time (for example, a virtual machine instance may be running on a first blade server at a first point in time, and then a different blade server in a different city at a second point in time); and (iii) make extensive use of computing resources located in and managed as cloud computing resources.

Cloud computing is an information technology (IT) paradigm that enables ubiquitous access to shared pools of configurable system resources and higher-level services that can be rapidly provisioned with minimal management effort, often over the internet. Cloud computing relies on sharing of resources to achieve coherence and economies of scale, similar to a public utility. Third-party clouds enable organizations to focus on their core businesses instead of expending resources on computer infrastructure and maintenance. Cloud computing typically allows companies to avoid or minimize up-front IT infrastructure costs. Cloud computing can allow enterprises to get their applications up and running faster, typically with improved manageability and less maintenance. Cloud computing typically enables IT teams to more rapidly adjust resources to meet fluctuating and unpredictable demand. Cloud providers typically use a "pay-as-you-go" model.

"Scaling" is a known concept in computing. As the term is used herein, scaling is the capability of adding or subtracting resources that are being utilized by an existing system.

BRIEF SUMMARY

According to one embodiment of the present disclosure, an approach is provided in which an information handling system receives a scaling request corresponding to an application that includes multiple workloads executing on a first cloud environment and a second cloud environment. The first cloud environment is managed by a first service provider and the second cloud environment is managed by a second service provider. The information handling system evaluates the scaling request against both a first set of policies corresponding to the first service provider and against a second set of policies corresponding to the second service provider. In turn, the information handling system scales, in response to the evaluating, one or more first resources on the first cloud environment and one or more second resources on the second cloud environment to fulfill the scaling request.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is an exemplary diagram depicting user policies that a user client provides to a central cloud management system;

FIG. 5 is an exemplary table showing various API actions that a central cloud management system supports;

FIG. 7 is an exemplary table depicting a scaling request that includes non-traditional scaling requests and scaling results;

DETAILED DESCRIPTION

Figure 1:
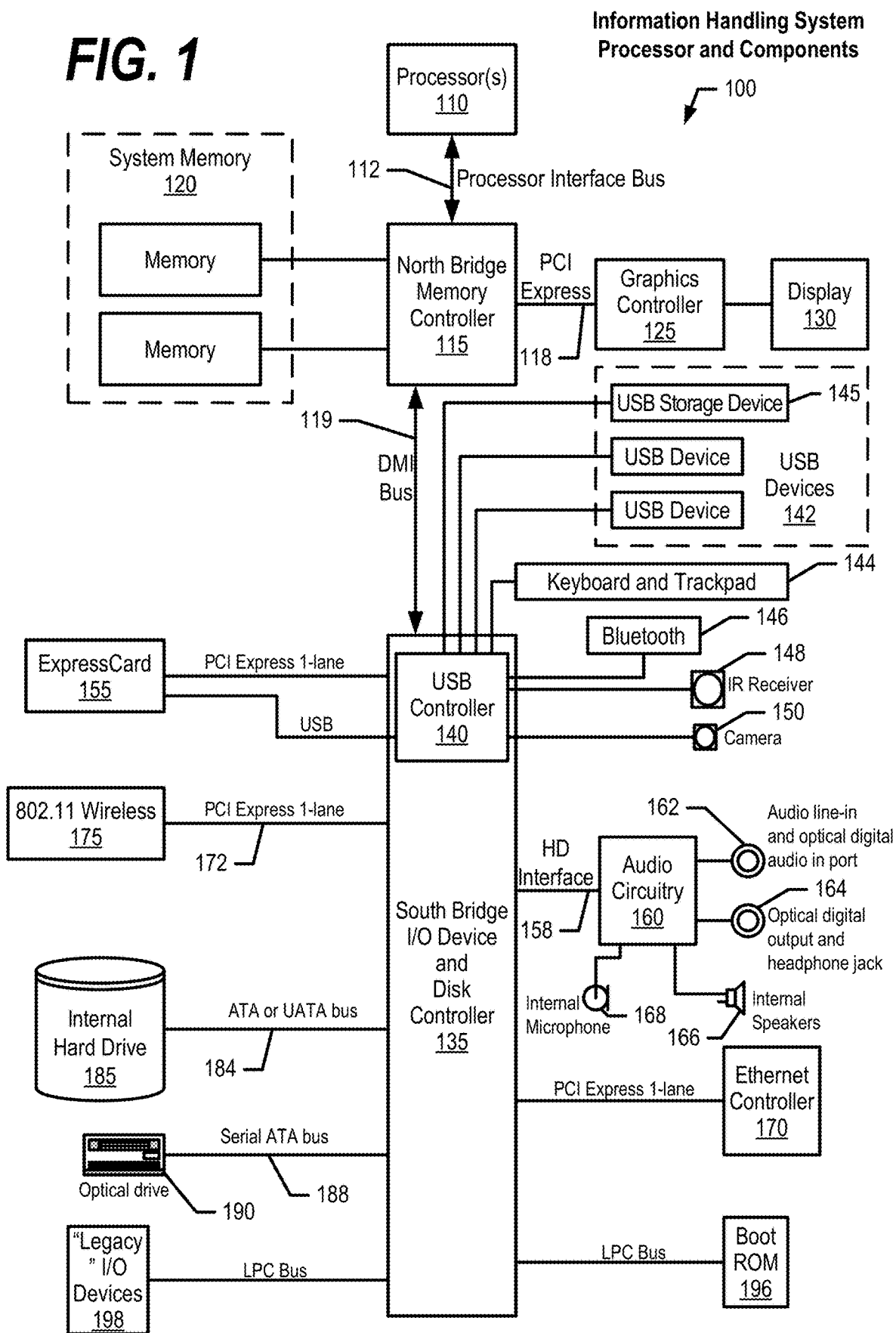
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
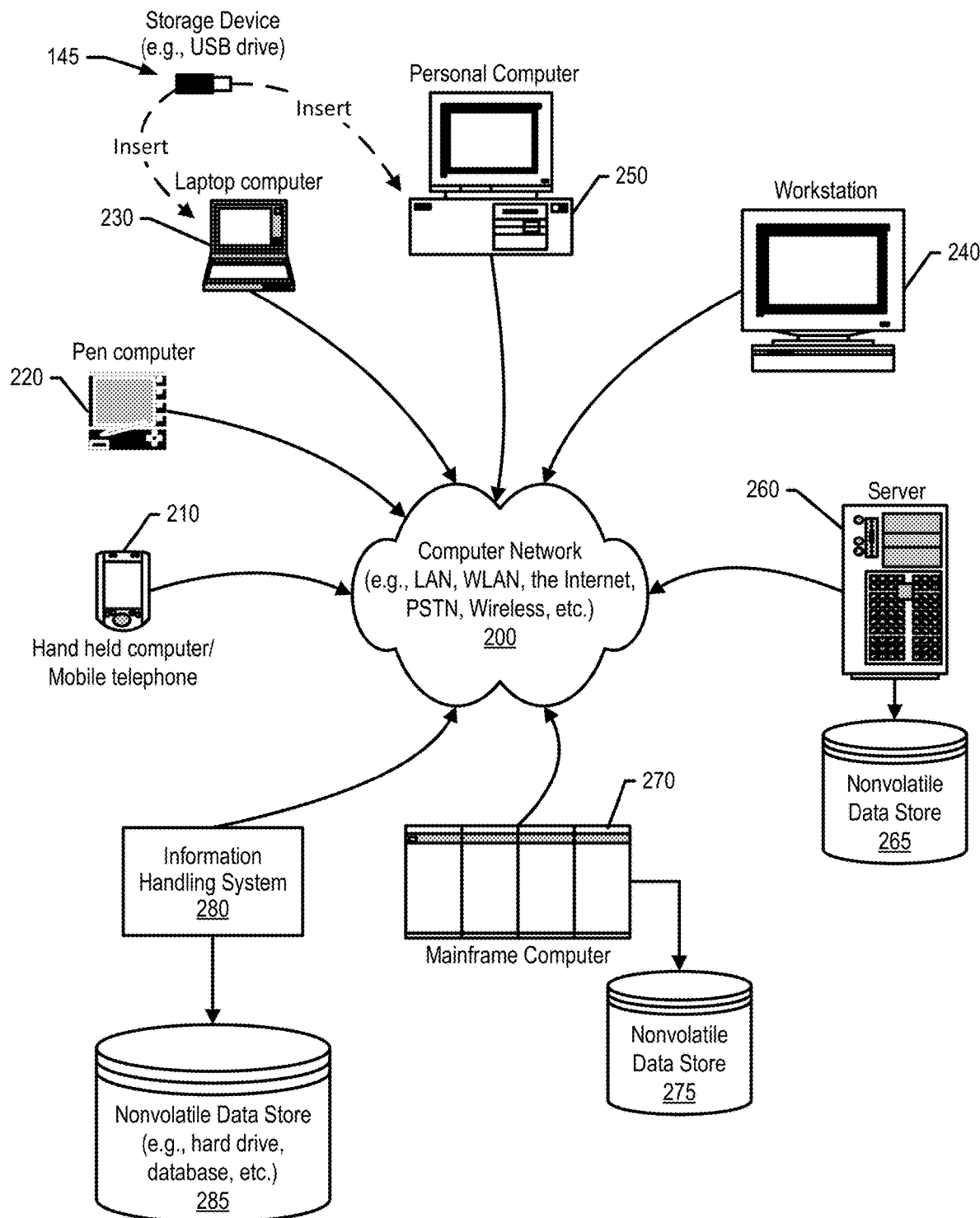
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, current hybrid cloud systems do not provide application workloads with the capability to dynamically scale resources across multiple cloud providers. FIGS. 3 through 9 depict an approach that can be executed on an information handling system that implements a policy based request/approval system to scale resources across multiple cloud environments/providers. With this approach, when a workload instance operating on a first cloud environment requires more or less resources, the workload instance sends a scaling request to a central cloud management system. The central cloud management system uses policies to determine if the workload instance's service provider automatically authorizes the scaling request or if the policies require an action such as notifying an administrator to approve the requested resources. When resources are not obtainable in the first cloud environment, the central cloud management system checks policies of other cloud environments and automatically allocates the resources at the different cloud environments or sends requests to their corresponding administrator.

In one embodiment, the central cloud management system enables workloads to span across cloud providers and request additional resources for situations such as scaling or enablement of disaster recovery (e.g. mirroring data) where automatic approval may be granted based on a policy with set limits and actions. The policy-based system resides in the central cloud management system that manages multiple cloud providers and has policies that are used for an individual deployment or a group of deployments. In addition, actions may be added to the policy to provide notifications and approvals when certain resource allocation actions occur.

Figure 3:
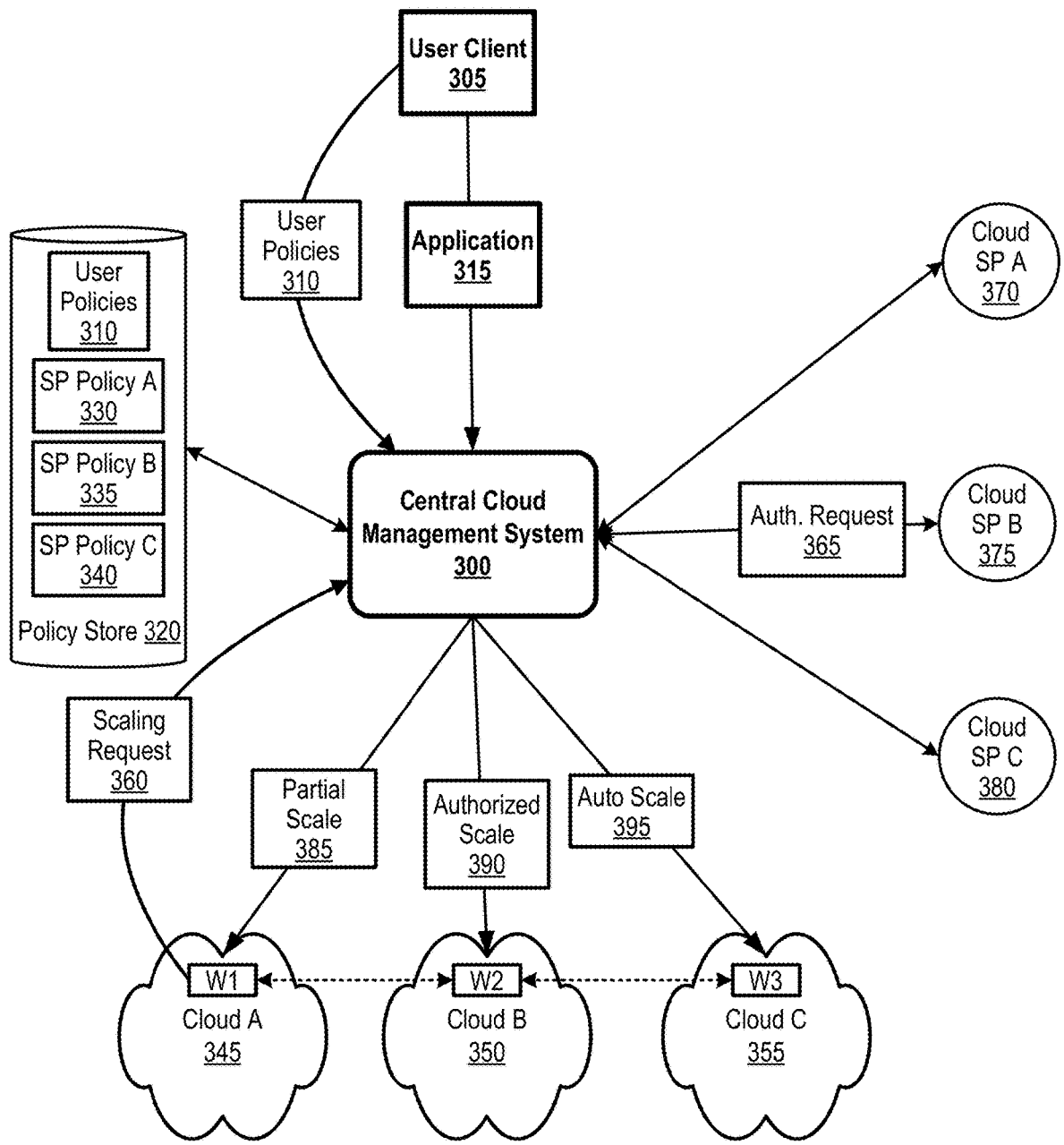
FIG. 3 is an exemplary diagram depicting a central cloud management system employing a policy based system to process scaling requests from workloads operating in a hybrid cloud environment.

FIG. 3 is an exemplary diagram depicting a central cloud management system employing a policy based system to process scaling requests from workloads operating in a hybrid cloud environment. Businesses require fine grained access control and permissions for deploying to multiple cloud providers. A business typically does not grant a user unlimited access to all cloud providers due to potential costs concerns, access/security concerns (e.g., not wanting the user to deploy a specific type of application in a production cloud environment), and concerns around protecting the integrity of running production workloads. Central cloud management system 300 provides fine grained control in a hybrid cloud environment for when and how a hybrid cloud deployment can scale out that does not exist with legacy systems by using a set of defined policies to automatically process scaling requests initiated by a user or workload.

Central cloud management system 300 receives user polices 310 from user client 305. User policies 310 includes a list of policies that, in one embodiment, are specific to application 315 or cover multiple applications corresponding to user client 305 (see FIG. 4 and corresponding text for further details). Central cloud management system 300 stores user policies 310 in policy store 320. Policy store 320 also includes service provider policies A 330, B 335, and C 340 that are received from cloud service provider A 370, cloud service provider B 375, and cloud service provider C 380, respectively. Service provider policies A 330, B 335, and C 340 provide rules pertaining to the service providers' resource allocations in their respective cloud A 345, cloud B 350, and cloud C 355.

When central cloud management system 300 receives application 315, central cloud management system 300 deploys workloads W1, W2, and W3 to cloud A 345, cloud B 350, and cloud C 355, respectively. Workloads W1, W2, and W3 are components of application 315. FIG. 1 shows that during execution, workload 1 is requesting a scaling change via scaling request 360, such as increasing memory or processing power. Central cloud management system 300 accesses service provider policy A 330, because W1 is executing on cloud A 345, and determines that service provider A 370 allows a partial scaling of W1's scaling request. For example, scaling request 360 requests increased CPU, increased memory, and decreased network resources and service provider A 370 allows the decreased network resources. As such, central cloud management system 300 performs a partial scaling (partial scale 385) on cloud A 345 to support workload W1.

To fulfill the remaining scaling request, central cloud management system 300 reviews a different service provider's policies, such as service provider B 335, and determines that cloud service provider B 375 requires individual scaling requests. As such, central cloud management system 300 sends authorization request 365 to cloud service provider B 375 and receives a response. In this example, cloud service provider B 375 authorizes an increase in memory in cloud B 350. As such, central cloud management system 300 scales cloud B 350 accordingly (authorized scale 390) and adjusts the workload from W1 to W2 so that W2 is able to utilize the increased memory. Central cloud management system 300 then reviews a different service provider's policies, such as service provider C 340, and determines that cloud service provider C 380 allows automatic authorization of increased CPU resources within a particular limit. As such, central cloud management system 300 scales cloud C 355 accordingly via auto scale 395 and adjusts the workload from W1 to W3 so that W3 is able to utilize the increased CPU resources. In short, central cloud management system 300 provides an automated and seamless approach to scaling resources across a hybrid cloud environment.

FIG. 4 is an exemplary diagram depicting user policies that a user client provides to central cloud management system 300. As those skilled in the art can appreciate, more or less user policies are utilized than what is shown in FIG. 4's user policies 310. Central cloud management system 300 is a generic policy handler that allows users to define policies across a hybrid cloud environment as to who can scale, how to scale, and what to do in the event a complete scale across cloud providers is not fulfilled. Central cloud management system 300 then executes the policies and aggregates the results from each individual cloud provider to make a higher level decision as to how to scale the entire hybrid cloud workload.

For example a user that wants to scale has access to a deployed hybrid cloud application that spans cloud A 345, cloud B 350, and cloud C 355, and has access to cloud A 345 and cloud B 350. The user, however, does not have access to scale additional resources on cloud C 355. In this example, a policy is either written to deny all scaling or only scale out the resources to which the user has access. The same type of logic is applied to groups of users, accounts on cloud providers, types of workloads, cloud providers being used, maximum amounts of individual resources that are allowed for a given provider, etc.

In another example, a user is restricted to scale out to a certain maximum amount of a resource on a specific cloud provider (e.g. can only scale up to six cores on cloud A 345, but can scale up a component on cloud B 350 to nine cores). Policies are created for each of these situations and then executed/aggregated at scale out time to decide how to scale out a hybrid cloud workload.

In addition to the policies shown in FIG. 4, central cloud management system 300, in one embodiment, applies policies in various groupings such as:
- Individual deployment: A policy is applied to a single deployment, and allows scaling for just the single deployment;
- Group of deployments: A policy is applied to a specific group of deployments and allows scaling for deployments that are part of the specific group;
- User or group of users: A policy is applied to specific users requesting an increase in resources, and allows scaling for just the specific users;
- Account (e.g. Organization/Space): A policy is applied to specific accounts (organizations and spaces), and only to workloads and users in the specific accounts.

FIG. 5 is an exemplary table showing various API (application programming interface) actions that central cloud management system 300 supports. A user and/or an application using the API sends various action commands (table 500) to central cloud management system 300 to create a user policy with one or more policies defined. As those skilled in the art can appreciate, central cloud management system 300 supports more, less, or different API actions than what is shown in FIG. 5's table 500.

Figure 6:
FIG. 6 is an exemplary table depicting a scaling request and scaling results across multiple cloud environments.

FIG. 6 is an exemplary table depicting a scaling request and scaling results across multiple cloud environments. Table 600 shows an example when workload W1's scaling request 360 is requesting an increase in CPU resources, an increase in memory resources, and a decrease in network resources. Scaling result 610 shows that cloud service provider A 370 allows a decrease in network resources, but central cloud management system 300 increased memory resources on cloud B 350 according to service provider policy B 335 and increased CPU resources on cloud C 355 according to service provider policy C 340. In turn, central cloud management system 300 fulfilled scaling request 360 by scaling resources across cloud A 345, cloud B 350, and cloud C 355.

FIG. 7 is an exemplary table depicting a scaling request that includes non-traditional scaling requests and scaling results. Table 700 shows an example when workload W1's scaling request 360 is requesting an increase in storage, an increase in security compliance, and a decrease in cost. Central cloud management system 300 evaluates service provider policy A 330 and determines, for example, that cloud service provider A 370 allows automatic authorization of each of the requests. In turn, central cloud management system 300 scales the storage, security compliance, and cost accordingly (scaling result 710).

Figure 8:
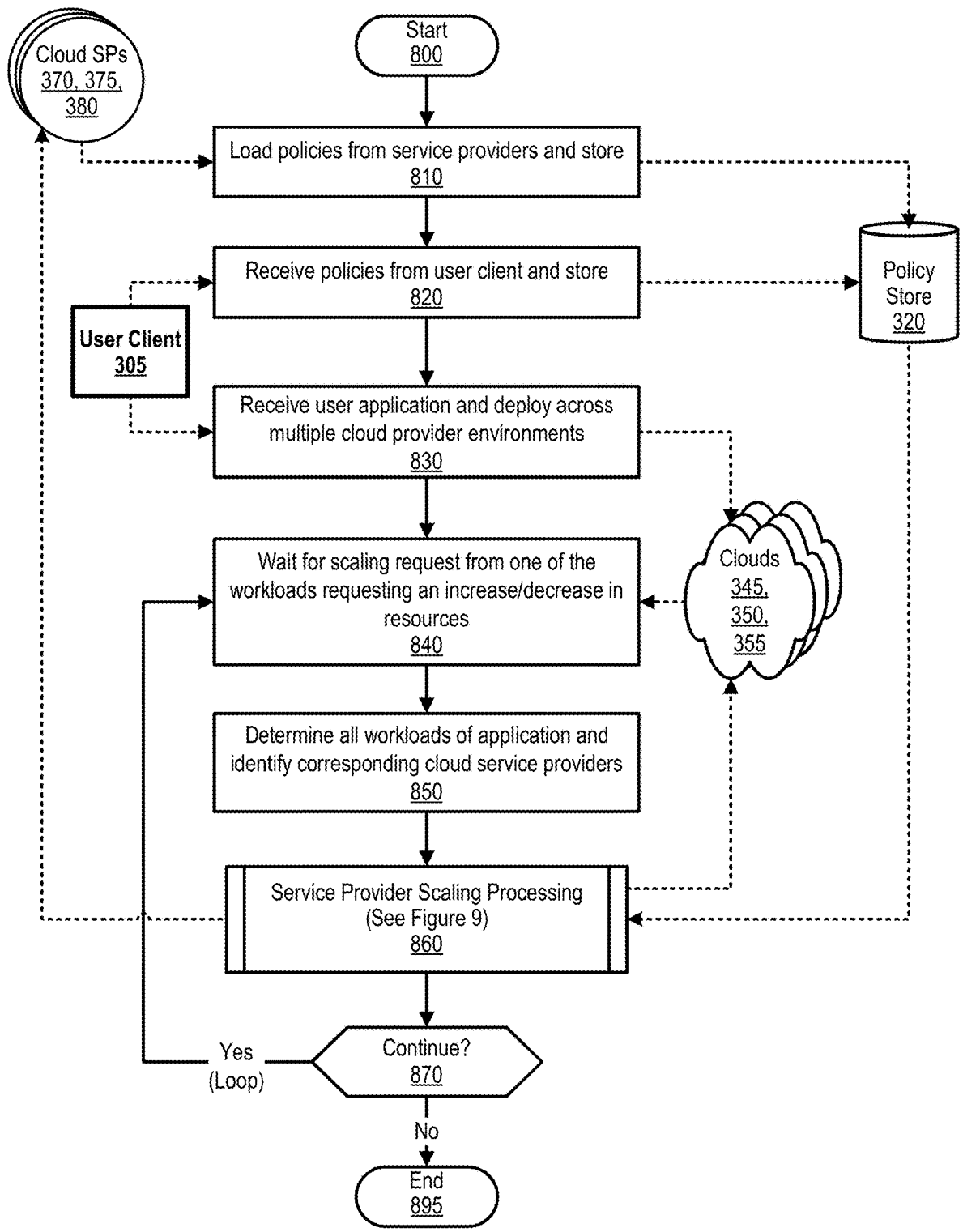
FIG. 8 is an exemplary flowchart showing steps taken to manage scaling requests in hybrid cloud environment.

FIG. 8 is an exemplary flowchart showing steps taken to manage scaling requests in hybrid cloud environment. FIG. 8 processing commences at 800 whereupon, at step 810, the process receives policies from service providers 370, 375, and 380, and stores them in policy store 320. At step 820, the process receives user policies 310 from user client 305 and stores them in policy store 320.

At step 830, the process receives application 315 and deploys application 315 across multiple cloud provider environments via multiple workloads W1, W2, and W3. At step 840, the process waits for a scaling request from one of the workloads (or user) requesting an increase/decrease in resources. When the process receives scaling request 360, the process, at step 850, determines all workloads corresponding to the requesting workload and identifies their corresponding cloud service providers. Referring to FIG. 3, central cloud management system 300 identifies workloads W2 and W3 along with their respective cloud service provider B 375 and cloud service provider C 380.

Figure 9:
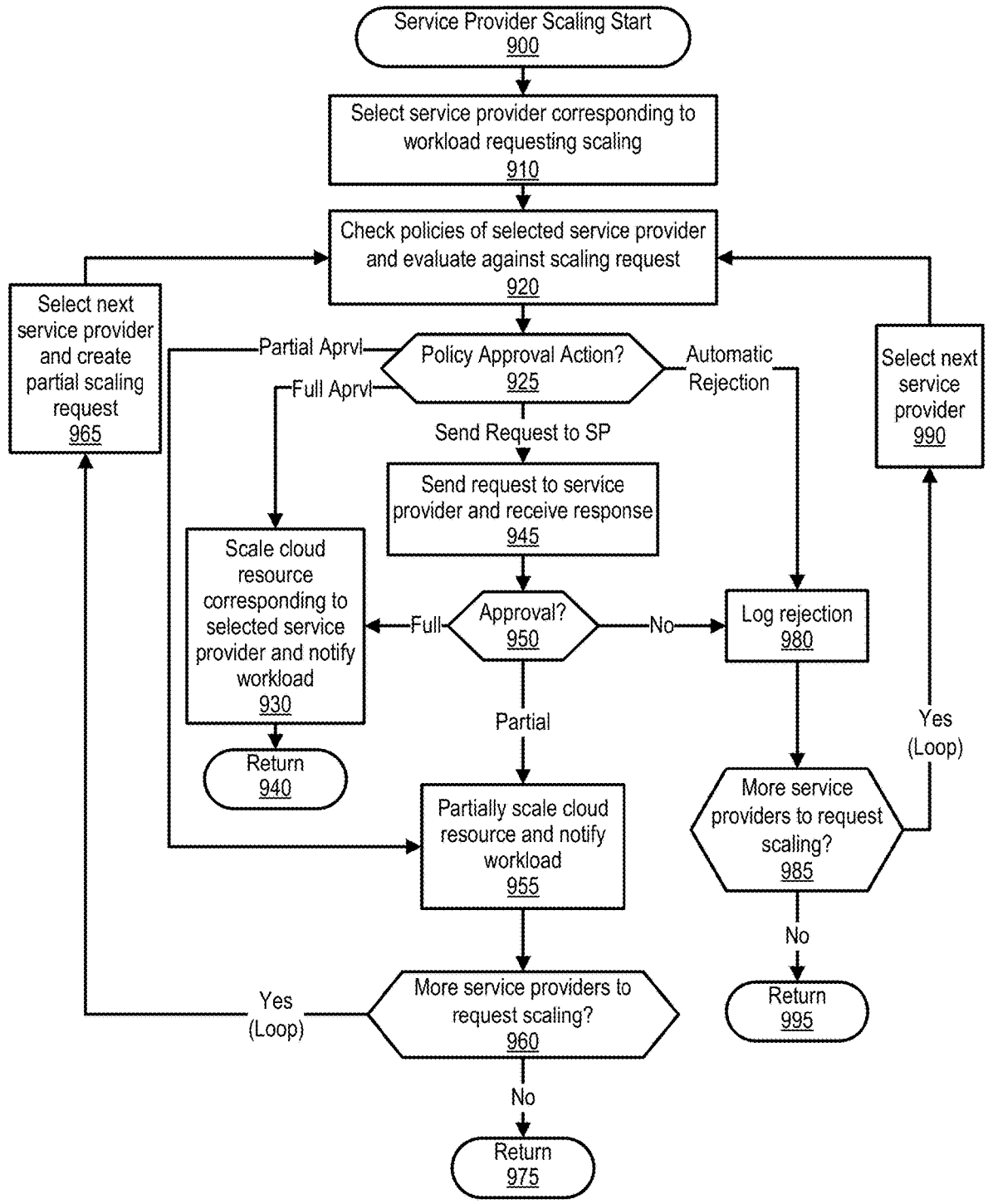
FIG. 9 is an exemplary flowchart showing steps to process a scaling request in a hybrid cloud environment.

At predefined process 860, the process processes the scaling request according to service provider policies (see FIG. 9 and corresponding text for processing details). The process determines as to whether to continue to process scaling requests (decision 870). If the process determines to continue, then decision 870 branches to the 'yes' branch which loops back to wait for the next scaling request. This looping continues until the process terminates, at which point decision 870 branches to the 'no' branch exiting the loop. FIG. 8 processing thereafter ends at 895.

FIG. 9 is an exemplary flowchart showing steps to process a scaling request in a hybrid cloud environment. FIG. 9 processing commences at 900 whereupon, at step 910, the process selects the service provider corresponding to the workload that requested the scaling. For example, referring to FIG. 3, the process selects cloud service provider A 370 because workload W1 is executing on cloud A 345 (managed by cloud service provider A 370).

At step 920, the process checks policies of the selected service provider (service provider policy A 330) and evaluates the policies against the scaling request. For example, if a workload requests more storage the process checks if the corresponding policy has storage defined along with associated service providers. The process determines as to which policy approval action to take (decision 925). For example, the scaling request requests a 25% increase in memory and the service provider policy indicates an automatic full approval of increasing memory, an automatic rejection of increasing memory, or a requirement to send a request to the service provider based on, for example, the amount of increase in memory.

If the policies indicate an automatic full approval (the entire scaling request is automatically approved), decision 925 branches to the "Full Approval" branch whereupon, at step 930, the process scales the cloud resources corresponding to selected service provider and notifies the workload. FIG. 9 processing thereafter returns to the calling routine (see FIG. 8) at 940. On the other hand, if the policies indicate a partial approval, decision 925 branches to the "Partial Approval" branch whereupon the process partially scales the cloud resources as discussed herein and notifies the workload accordingly. The process then proceeds to step 960 to attempt to fulfill the remaining portion of the scaling request that is unfulfilled as discussed below.

On the other hand, if the policies indicate a requirement to send a request to the service provider, decision 925 branches to the "Send Request to SP" branch whereupon, at step 945, the process sends a scaling request to the service provider and receives a response. The process determines as to whether the service provider approved the entire scaling request, partially approved the scaling request, or rejected the scaling request (decision 950). If the service provider approved the entire scaling request, then decision 950 branches to the "Full" branch whereupon, at step 930, the process scales the cloud resources corresponding to selected service provider and notifies the workload.

On the other hand, if the service provider partially approved the scaling request, then decision 950 branches to the "Partial" branch whereupon, at step 955, the process partially scales the cloud resources and notifies the workload. The process determines as to whether there are more service providers to fulfill the remaining scaling request (decision 960). If there are more service providers to send a scaling request, decision 960 branches to the "Yes" branch, which loops back to select the next service provider and create a partial scaling request to send to the next service provider (step 965). This looping continues until the scaling request is fulfilled or there are no more service providers to send a request, at which point decision 960 branches to the "No" branch. FIG. 9 processing thereafter returns to the calling routine (see FIG. 8) at 975.

Referring back to decision 950, if the service provider rejects the scaling request, then decision 950 branches to the "no" branch whereupon the process logs the rejection at step 980. Likewise, referring back to decision 925, if the service provider's policies indicate an automatic rejection to the scaling request, then decision 925 branches to the "Automatic Rejection" branch whereupon the process logs the rejection at step 980. The process determines as to whether there are more service providers to request scaling (either partial or full) (decision 985). If there are more service providers to request scaling, then decision 985 branches to the 'yes' branch which loops back to select the next service provider and send a request (partial or full) to the selected service provider (step 990). This looping continues until the scaling request is fulfilled or there are no more service providers to send a request, at which point decision 985 branches to the 'no' branch exiting the loop. FIG. 9 processing thereafter returns to the calling routine (see FIG. 8) at 995.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   receiving a scaling request corresponding to an application that comprises a plurality of workloads executing on at least a first cloud environment and a second cloud environment, wherein the first cloud environment is managed by a first service provider and the second cloud environment is managed by a second service provider;
   evaluating the scaling request against both a first set of policies corresponding to the first service provider and against a second set of policies corresponding to the second service provider;
   determining that the first set of policies indicates that an authorization is required by the first service provider;
   in response to determining the authorization is required by the first service provider, sending the scaling request to the first service provider to scale a set of first resources on the first cloud environment;
   receiving a response from the first service provider corresponding to the authorization;
   in response to determining that the response indicates the first service provider authorizes a first portion of the scaling request, scaling a portion of the set of first resources on the first cloud environment;
   determining that the first set of polices prevents a second portion of the scaling request from being fulfilled; and
   in response to determining that the second portion of the scaling request is unfulfilled:
      determining that the second set of policies allows the unfulfilled portion of the scaling request; and
      scaling one or more second resources corresponding to the unfulfilled portion of the scaling request on the second cloud environment.

2. The method of claim 1 wherein:
the scaling request is initiated by the first workload.

3. The method of claim 2 further comprising:
   receiving a different scaling request from the first workload;
   in response to determining that the first set of policies rejects the different scaling request, determining that the second set of policies authorizes the different scaling request; and
   scaling one or more different second resources on the second cloud environment to fulfill the different scaling request.

4. The method of claim 1 wherein the scaling request includes at least one request selected from the group consisting of an adjustment to security compliance, an adjustment to cost, an adjustment to storage, and an adjustment to network bandwidth.

5. An information handling system comprising:
   one or more processors;
   a memory coupled to at least one of the processors;
   a set of computer program instructions stored in the memory and executed by at least one of the processors in order to perform actions of:
      receiving a scaling request corresponding to an application that comprises a plurality of workloads executing on at least a first cloud environment and a second cloud environment, wherein the first cloud environment is managed by a first service provider and the second cloud environment is managed by a second service provider;
      evaluating the scaling request against both a first set of policies corresponding to the first service provider and against a second set of policies corresponding to the second service provider;
      determining that the first set of policies indicates that an authorization is required by the first service provider;

in response to determining the authorization is required by the first service provider, sending the scaling request to the first service provider to scale a first set of first resources on the first cloud environment;

receiving a response from the first service provider corresponding to the authorization;

in response to determining that the response indicates the first service provider authorizes a first portion of the scaling request, scaling a portion of the first set of first resources on the first cloud environment;

determining that the first set of polices prevents a second portion of the scaling request from being fulfilled; and in response to determining that the second portion of the scaling request is unfulfilled:

determining that the second set of policies allows the unfulfilled portion of the scaling request; and scaling one or more second resources corresponding to the unfulfilled portion of the scaling request on the second cloud environment.

6. The information handling system of claim 5 wherein: the scaling request is initiated by the first workload.

7. The information handling system of claim 6 wherein the processors perform additional actions comprising:

receiving a different scaling request from the first workload;

in response to determining that the first set of policies rejects the different scaling request, determining that the second set of policies authorizes the different scaling request; and scaling one or more different second resources on the second cloud environment to fulfill the different scaling request.

8. The information handling system of claim 5 wherein the scaling request includes at least one request selected from the group consisting of an adjustment to security compliance, an adjustment to cost, an adjustment to storage, and an adjustment to network bandwidth.

9. A computer program product stored in a computer readable storage medium, comprising computer program code that, when executed by an information handling system, causes the information handling system to perform actions comprising:

receiving a scaling request corresponding to an application that comprises a plurality of workloads executing on at least a first cloud environment and a second cloud environment, wherein the first cloud environment is managed by a first service provider and the second cloud environment is managed by a second service provider;

evaluating the scaling request against both a first set of policies corresponding to the first service provider and against a second set of policies corresponding to the second service provider;

determining that the first set of policies indicates that a n authorization is required by the first service provider;

in response to determining the authorization is required by the first service provider, sending the scaling request to the first service provider to scale a first set of first resources on the first cloud environment;

receiving a response from the first service provider corresponding to the authorization;

in response to determining that the response indicates the first service provider authorizes a first portion of the scaling request, scaling a portion of the first set of first resources on the first cloud environment;

determining that the first set of polices prevents a second portion of the scaling request from being fulfilled; and in response to determining that the second portion of the scaling request is unfulfilled:

determining that the second set of policies allows the unfulfilled portion of the scaling request; and scaling one or more second resources corresponding to the unfulfilled portion of the scaling request on the second cloud environment.

10. The computer program product of claim 9 wherein: the scaling request is initiated by the first workload.

11. The computer program product of claim 10 wherein the information handling system performs further actions comprising:

receiving a different scaling request from the first workload;

in response to determining that the first set of policies rejects the different scaling request, determining that the second set of policies authorizes the different scaling request; and scaling one or more different second resources on the second cloud environment to fulfill the different scaling request.

* * * * *